(12) United States Patent
Purcell et al.

(10) Patent No.: US 6,286,023 B1
(45) Date of Patent: Sep. 4, 2001

(54) PARTITIONED ADDER TREE SUPPORTED BY A MULTIPLEXER CONFIGURATION

(75) Inventors: Stephen C. Purcell, Mountain View; Nital P. Patwa, San Jose, both of CA (US)

(73) Assignee: ATI International SRL, Hastings (BB)

( * ) Notice: Subject to any disclaimer, the term of this patent is extended or adjusted under 35 U.S.C. 154(b) by 0 days.

(21) Appl. No.: 09/100,385

(22) Filed: Jun. 19, 1998

(51) Int. Cl.$^7$ ........................................ G06F 7/52
(52) U.S. Cl. ............................. 708/620; 708/625
(58) Field of Search ....................... 708/620, 625

(56) References Cited

U.S. PATENT DOCUMENTS

| | | | |
|---|---|---|---|
| 4,754,421 | * | 6/1988 | Bosshart .............................. 708/625 |
| 5,742,538 | * | 4/1998 | Guttag et al. ........................ 708/628 |
| 5,764,558 | * | 6/1998 | Pearson et al. ...................... 708/625 |

* cited by examiner

*Primary Examiner*—Tan V. Mai
(74) *Attorney, Agent, or Firm*—Skjerven Morrill MacPherson LLP; Edward C. Kwok

(57) ABSTRACT

An adder tree is partitioned into two parts. One multiplexer provides a first bit group to the first part of the tree. A second multiplexer provides a second bit group to the second part of the tree. The two multiplexers provide the same bits groups to the respective parts in response to a first instruction, and provide different bit groups in response to a second instruction. Therefore, the first instruction allows for the single multiplication of the number represented by the first bit group by another number provided to collectively represented to both parts of the tree. The second instruction causes the multiplication of the first bit group by the third bit group in the first part of the adder tree, and causes another multiplication of the second bit group by the fourth bit group in the second part of the adder tree.

7 Claims, 4 Drawing Sheets

_US 6,286,023 B1_

PARTITIONED ADDER TREE SUPPORTED BY A MULTIPLEXER CONFIGURATION

FIELD OF THE INVENTION

The present invention relates to microprocessor technology, and more specifically, the present invention relates the use of an arithmetic logic unit (ALU) to perform a variety to multiplication formats.

BACKGROUND OF THE INVENTION

The multiplication of two values is a common operation performed in arithmetic logic units. A conventional multiplier (e.g., a 16×6 multiplier) receives a 16-bit multiplicand and a 16-bit multiplier and generates a 32-bit product using a Wallace tree.

The multiplier requires input values of a fixed bit length of 16 bits each. In order to multiply values having other bit length (e.g., a 4×4 multiplication), the input values must be bit extended with additional bits having no additional information. For example, if a 4×4 operation is to be performed, the 4-bit input values must be extended to 16 bits before multiplication. The additional 12 bits of each input have no useful information resulting in the 32-bit product having 24 bits of useless information.

Furthermore, the current multiplier is limited in that it only performs multiplication in series, one multiplication per operation cycle.

Therefore, what is desired is a circuit and method which 1) increase the input bit size format flexibility of the multiplier thereby reducing input value bit extension, and 2) allow for several multiplications to be performed in parallel using a single multiplier.

SUMMARY OF THE INVENTION

A circuit has a partitioned adder tree having first and second parts. A multiplexer is configured such that a bit group represented at the output terminal of the multiplexer is represented at the first part of the partitioned adder tree. A second multiplexer is configured such that a bit group represented at its output terminal is also represented at the second part of the partitioned adder tree.

The two multiplexers provide the same bits groups at their respective output terminals in response to a first instruction. The two multiplexers provide a different bit group at their respective output terminals in response to a second instruction.

The circuit may also include a third and fourth multiplexer. The third multiplexer is configured such that the bit group represented at its output terminal is represented at the first part of the partitioned adder tree. The fourth multiplexer is configured such that the bit group represented at its output terminal is represented at the second part of the partitioned adder tree. The third and fourth multiplexers provide bit groups representing portions of the same value in response to the first instruction. The third and fourth multiplexers provide bit groups representing different values in response to the second instruction.

A method includes providing an identical bit group to each of a first and second part of a partitioned adder tree in response to a first instruction; and providing different bit groups to the first and second parts of the partitioned adder tree in response to a second instruction.

The above circuit and method provide for a partitioned adder tree that multiplies using a variety of input bit size formats. Furthermore, several multiplications may be performed in parallel in the same partitioned adder tree.

DETAILED DESCRIPTION OF THE INVENTION

The present invention is illustrated below by specific embodiments. These embodiments are illustrative only and not limiting. Throughout the description and figures, like identification symbols indicate like elements except where otherwise noted.

Figure 1:
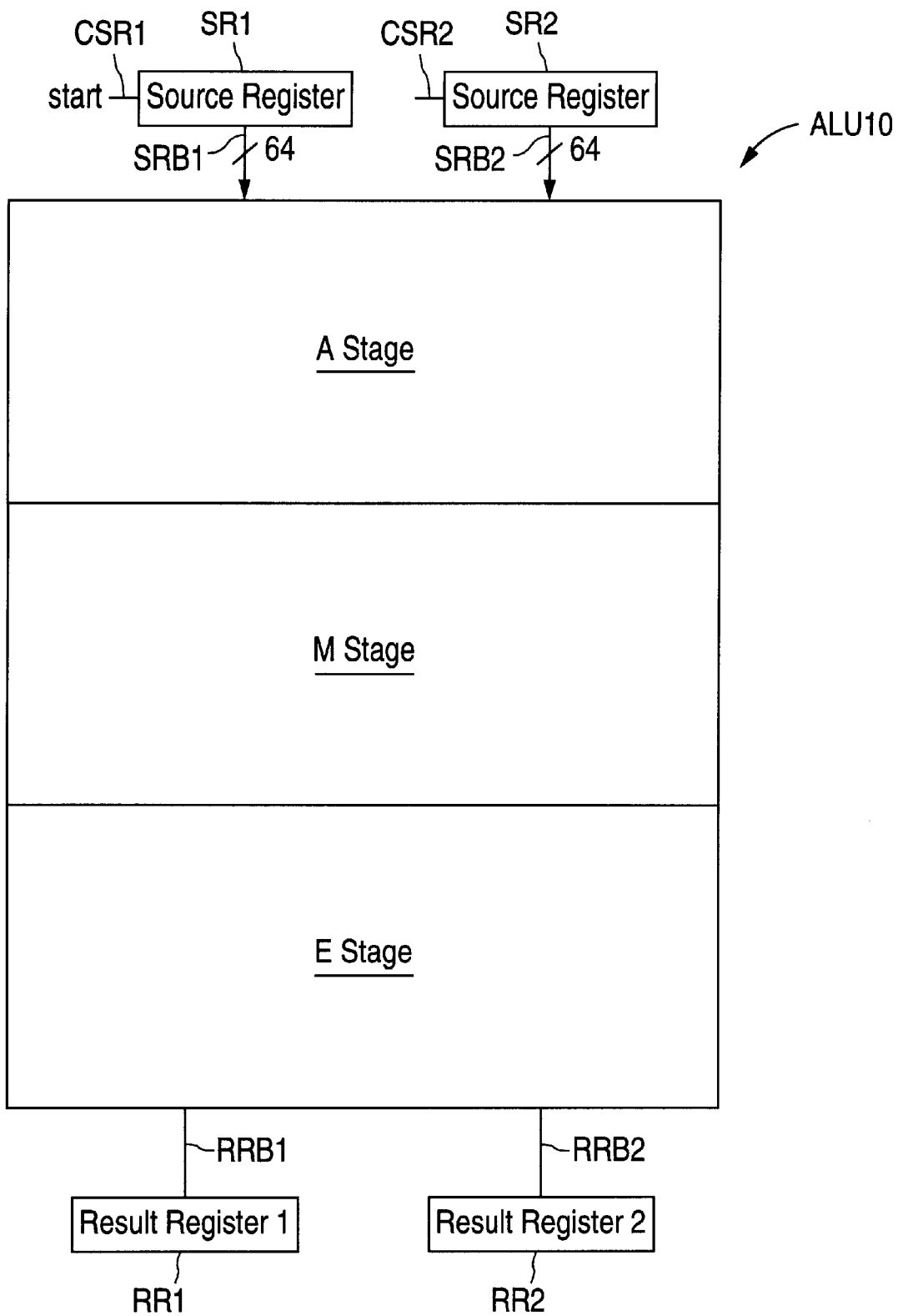
FIG. 1 is a schematic diagram of an arithmetic logic unit having three stages, labeled respectively as the A stage, the M stage, and the E stage.

FIG. 1 is a schematic diagram of an arithmetic logic unit (ALU 10) having three stages, labeled respectively as the A stage, the M stage, and the E stage. ALU 10 includes two input source registers SR1 and SR2 connected to the A stage with respective buses SRB1 and SRB2, and two result registers RR1 and RR2 connected to E stage by respective buses RRB1 and RRB2.

The A stage (described in detail below) flexibly performs multiplications of a variety of formats of values. The A stage also performs a single multiplication or several multiplications simultaneously and writes the results in a sum and carry register. The A stage encompasses the present invention.

The M stage processes the values in the sum and carry registers according to a variety of format instructions to produce a preliminary redundant multiplication result. For example, in response to one instruction, the M stage takes the results of four 16×64 multiplications in the A stage to compute the product of a 64×64 multiplication. The E stage converts the redundant carry save values to a final result using a carry propagate adder (CPA).

Figure 2:
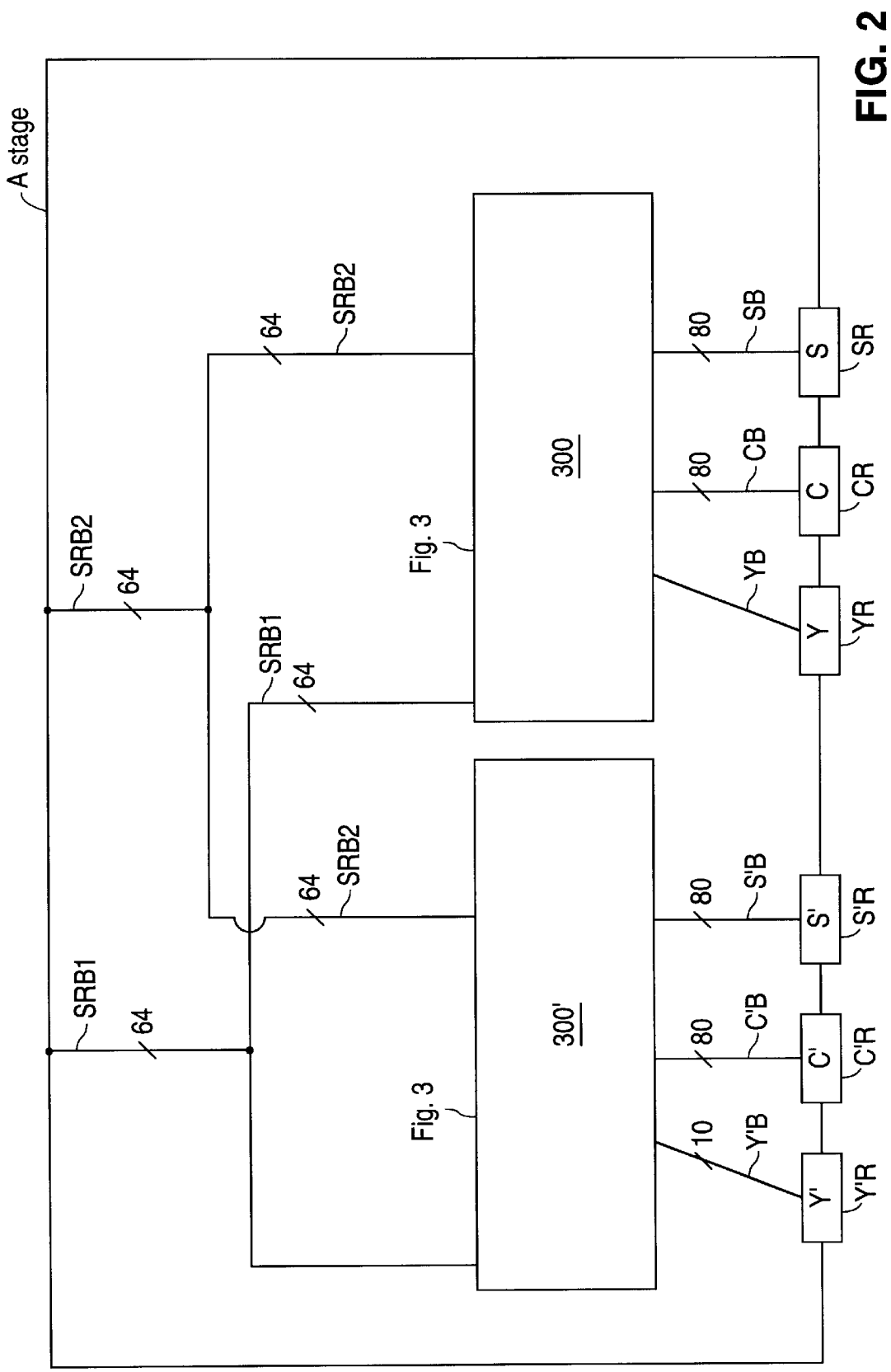
FIG. 2 is a general schematic diagram of the A stage of the arithmetic logic unit of FIG. 1.

FIG. 2 is a general schematic diagram of the A stage of ALU 10. The A stage is configured such that each multiplier 300 and 300' performs at least the following operations 1, 2, and 3:

1). four 8×8 multiplications;
2). two 16×16 multiplications; and
3). one 64×64 multiplication.

Source register SR1 stores multiplier values while source register SR2 stores multiplicand values. If four 8×8 multiplications (operation 1) are to be performed in each multiplier 300 and 300', each 8-bit group of the 64-bit sequence A (A[7:0], A[15:8], A[23:16], A[31:24], A[39:32], A[47:40], A[55:48], and A[63:56]) in register SR1 represents an 8-bit multiplier. Each corresponding 8-bit group of bit sequence B (B[7:0], B[15:8], B[23:16], B[31:24], B[39:32], B[47:40], B[55:48], and B[63:56]) in register SR2 represents a corresponding 8-bit multiplicand. If two 16×16 multiplications (operation 2) are to be performed in each multiplier 300 and 300', each 16-bit group (A[15:0], A[31:16], A[47:32], A[63:48], B[15:0], B[31:16], B[47:32], and B[63:48]) in the source registers SR1 and SR2 represents a respective multiplier and multiplicand. If one 64×64 multiplication (operation 3) is to be performed in four cycles in multiplier 300, 16 bits of bit sequence "A" per cycle (A[15:0], A[31:16], A[47:32] and A[63:48]) represents the four 16-bit multipliers while all 64 bits B[63:0] of bit sequence "B" represent the common multiplicand. Multiplier 300' is idle. The products are left shifted and added together in the M and E stages.

The 64-bit sequences A[63:0] and B[63:0] are read over respective buses SRB1 and SRB2 to multipliers 300 and 300'. As described hereinafter, multiplier 300 provides an 80-bit sum S[79:0] over bus SB to sum register SR, an 80-bit carry C[79:0] over bus CB to carry register CR, and a 10-bit boundary carry Y[9:0] over bus YB to boundary carry register YR. Similarly, multiplier 300' is configured to provide sum bits S'[79:0], carry bits C'[79:0], and boundary carry bits Y'[9:0] over buses S'B, C'B, and Y'B to registers S'R, C'R, and Y'R, respectively.

Figure 3:
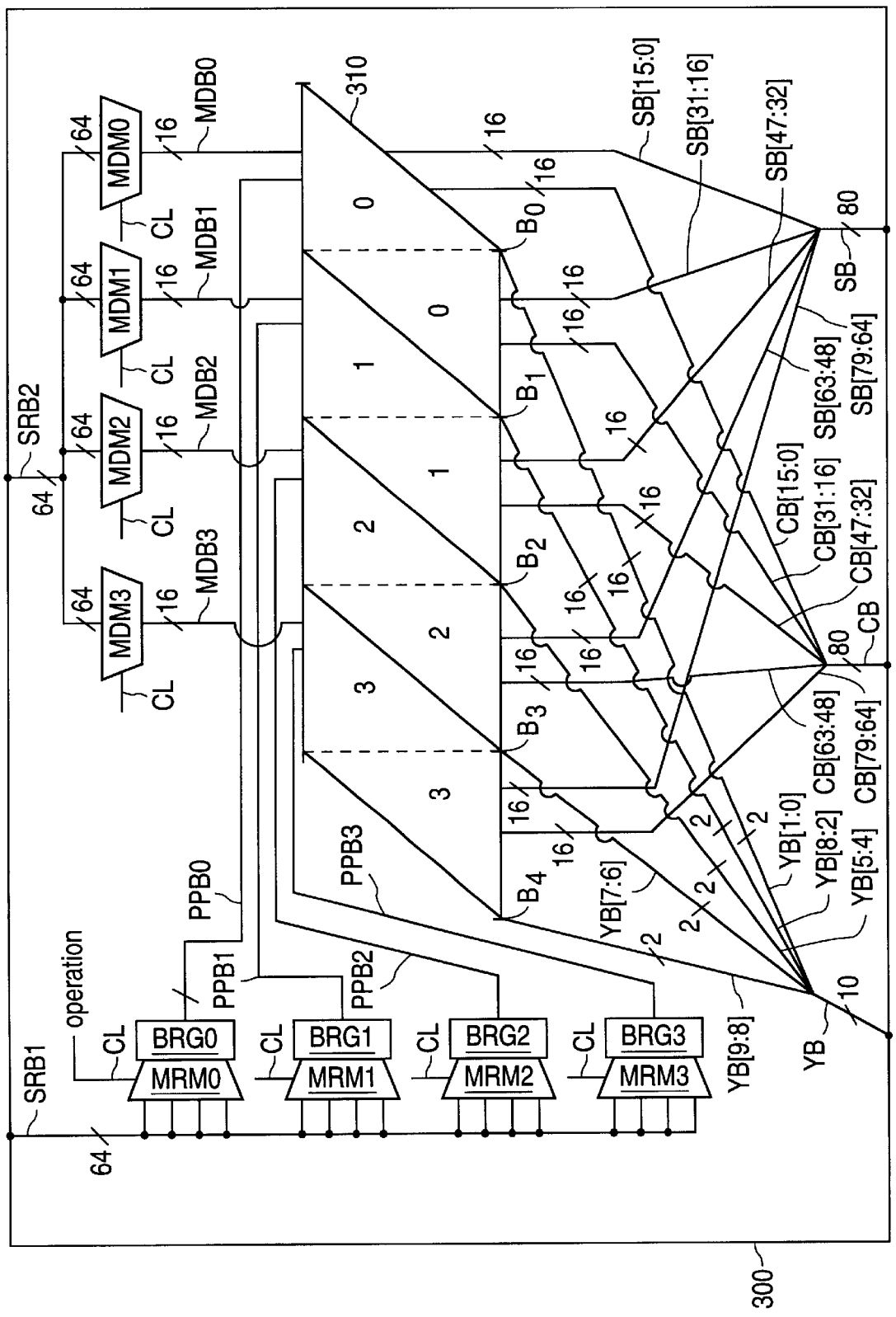
FIG. 3 is a detailed diagram of one of the two multipliers of FIG. 2.

Multipliers 300 and 300' are next described using FIG. 3 which is a detailed diagram of multiplier 300 of FIG. 2. Bus SRB1 is connected to each of four multiplier multiplexers MRM0, MRM1, MRM2, and MRM3. D The multiplexers MRM0, MRM1, MRM2, and MRM3 pass some of the 64 bits to respective booth-recoder groups BRG0, BRG1, BRG2, and BRG3 in response to a control signal "operation" (representing the specific operation to be performed) on control line CL. Booth-recoder groups BRG0, BRG1, BRG2, and BRG3 contain booth-recoders which booth-recode the bits provided by the respective multiplexers MRM0, MRM1, MRM2, and MRM3. Booth-recoder groups BRG0, BRG1, BRG2, and BRG3 generate partial product control signals over respective partial product buses PPB0, PPB1, PPB2, and PPB3 to respective parts 0, 1, 2, and 3 of partitioned adder tree 310.

Bus SRB2 is connected to each of four multiplicand multiplexers MDM0, MDM1, MDM2, and MDM3. Multiplexers MDM0, MDM1, MDM2, and MDM3 pass some of the 64 bits from bus SRB2 over respective buses MDB0, MDB1, MDB2, and MDB3 to respective parts 0, 1, 2, and 3 of partitioned adder tree 310. Multiplexers MRM0, MRM1, MRM2, MRM3, MDM0, MDM1, MDM2, and MDM3 are controlled by the signal "operation" on bus CL.

Carry boundaries B0, B1, B2, B3, and B4 are provided within partitioned adder tree 310 between columns every 16 bits. Specifically, carry boundary B0 is provided between bit columns 15 and 16, carry boundary B1 between bit columns 31 and 32, carry boundary B2 between bit columns 47 and 48, and carry boundary B3 between bit columns 63 and 64. Carry boundary B4 receives the carry bit generated from bit column 79 of partitioned adder tree 310. The structures of these carry boundaries B0, B1, B2, B3, and B4 are illustrated by carry boundary B3, which is described in detail hereinafter with respect to FIG. 4. The carry boundaries B0, B1, B2, B3, and B4 prevent any carry out generated to the right of the carry boundary B0, B1, B2, B3, and B4 from being carried to the left of the carry boundary B0, B1, B2, B3, or B4 when the carry boundary B0, B1, B2, B3, and B4 is active.

In operation 1 (i.e., four 8×8 multiplications), the carry boundaries B0, B1, B2, and B3 are active. Multiplexers MRM0, MRM1, MRM2, MRM3, MDM0, MDM1, MDM2, and MDM3 are controlled during operation 1 according to Table 1.

TABLE 1

| Multiplexer | Bits Passed | Partitioned Adder Tree 310 Destination | Booth Recoded? |
| --- | --- | --- | --- |
| MRM0 | A[7:0] | 0 | Yes |
| MRM1 | A[15:8] | 1 | Yes |
| MRM2 | A[23:16] | 2 | Yes |
| MRM3 | A[31:24] | 3 | Yes |
| MDM0 | B[7:0] | 0 | No |
| MDM1 | B[15:8] | 1 | No |
| MDM2 | B[23:16] | 2 | No |
| MDM3 | B[31:24] | 3 | No |

Part 0, 1, 2, and 3 of partitioned adder tree 310 are configured to multiply the value provided by the respective multiplicand multiplexer MDM0, MDM1, MDM2, and MDM3, by the value provided by the corresponding multiplier multiplexer MRM0, MRM0, MRM2, and MRM3. Therefore, the multiplication A[7:0]xB[7:0] is performed in part 0 of the partitioned tree 310 to the right of carry boundary B0. The multiplication A[15:8]xB[15:8], A[23:16] xB[23:16], and A[31:24]xB[31:24] are respectively performed in parts 1, 2, and 3 of partitioned tree 310 to the right of the respective carry boundary B1, B2, and B3.

The 16-bit sums S[15:0], S[31:16], S[47:32], and S[63:48] generated by respective parts 0, 1, 2 and 3 are provided over respective buses SB[15:0], SB[31:16], SB[47:32], and SB[63:48] to respective locations [15:0], [31:16], [47:32], and [63:48] of sum register SR. The 16-bit carries C[15:0], C[31:16], C[47:32], and C[63:48] generated by respective parts 0, 1, 2, and 3 are provided over respective buses CB[15:0], CB[31:16], CB[47:32], and CB[63:48] to respective locations [15:0], [31:16], [47:32], and [63:48] of carry register CR. Therefore, registers SR and CR contain respective sum and carry bits for four 8×8 products.

Multiplexers MRM0, MRM1, MRM2, MRM3, MDM0, MDM1, MDM2, and MDM3 are controlled during operation 2 (i.e., two 16×16 multiplications) according to Table 2.

TABLE 2

| Multiplexer | Bits Passed | Partitioned Adder Tree 310 Destination | Booth Recoded |
| --- | --- | --- | --- |
| MRM0 | A[15:0] | 0 | Yes |
| MRM1 | none | n.a. | n.a. |
| MRM2 | A[31:16] | 2 | Yes |
| MRM3 | none | n.a. | n.a. |
| MDM0 | B[15:0] | 0 | No |
| MDM1 | zero's | 1 | No |
| MDM2 | B[32:16] | 2 | No |
| MDM1 | zero's | 3 | No |

In operation 2, carry boundaries B0 and B2 are not active, but carry boundaries B1 and B3 are active. The multiplication [15:0]xB[15:0] is performed in part 0 of partitioned adder tree 310, and the multiplication A[31:16]XB[31:16] is performed in part 2 of partitioned tree 310.

Part 1 of partitioned adder tree 310 has forced 0's, forced by a zero control to MDM1, so that resulting sum and carry bits S[31:0] and C[31:0] generated in part 0 are provided on respective buses SB[31:0] and CB[31:0] to locations [31:0] of respective registers SR and CR. Part 3 of partitioned adder tree 310 has forced 0's so that resulting sum and carry bits S[63:32] and C[63:32] generated in part 2 are provided on respective buses SB[63:32] and CB[63:32] to locations

[63:32] of respective registers SR and CR. The carry boundary B1 prevents any unwanted carry from part 0 from propagating into the multiplication in part 2. For example, carry generated from adding the most significant bit of part 0 is discarded so that the carry has no effect on the addition of the least significant bit of part 2. Therefore, registers SB and CB are configured to contain respective sum and carry bits for two 16×16 products.

Multiplexers MRM0, MRM1, MRM2, MRM3, MRM0, MRM1, MRM2, and MDM3 are controlled during operation 3 (i.e., one 16×64 multiplication) according to Table 3.

TABLE 3

| Multiplexer | Bits Passed | Partitioned Adder Tree 310 Destination | Booth Recoded |
|---|---|---|---|
| MRM0 | A[15:0] | 0 | Yes |
| MRM1 | A[15:0] | 1 | Yes |
| MRM2 | A[15:0] | 2 | Yes |
| MRM3 | A[15:0] | 3 | Yes |
| MDM0 | B[15:0] | 0 | No |
| MDM1 | B[31:16] | 1 | No |
| MDM2 | B[47:32] | 2 | No |
| MDM3 | B[63:48] | 3 | No |

The multiplications A[15:0]xB[15:0], A[15:0]xB[31:16], A[15:0]xB[47:32], and A[15:0]xB[63:48] are performed in respective parts 0, 1, 2, and 3 of partitioned adder tree 310. Since carry boundaries B0, B1, B2, and B3 are not active, bits having equal weights from neighboring parts (e.g., the bits in the vertically overlapped columns of parts 0 and 1) are added together. The resulting sum and carry bits S[79:0] and C[79:0], representing the sum and carry bits generated from a 16×64 multiplication, are provided over respective buses SB[79:0] and CB[79:0] to locations [79:0] of respective registers SR and CR. Three more 16×64 multiplications A[31:16]xB[63:0], A[47:32]xB[63:0] and A[63:48]xB[63:0] are similarly performed in three successive cycles. The three corresponding products are left shifted by 16, 32 and 48 bits, respectively, and added to the product of A[15:0]xB[63:01 to complete a multiplication A[63:0]xB[63:0]. Therefore, multiplier 300 performs a variety of different multiplications (operations 1, 2,and 3) using a single partitioned adder tree 310 and a configuration of multiplexers MRM0, MRM1, MRM2, MRM3, MDM0, MDM1, MDM2, and MDM3. Multiplier 300' is structured similar to multiplier 300 and performs operations 1, 2,and 3 in the same manner as described above for multiplier 300.

The carry boundary B0, B1, B2, B3, and B4 prevent carry from the right of the carry boundary B0, B1, B2, B3, and B4 from being provided to the left of the carry boundary B0, B1, B2, B3, and B4 when the carry boundary B0, B1, B2, B3, and B4 is active.

Figure 4:
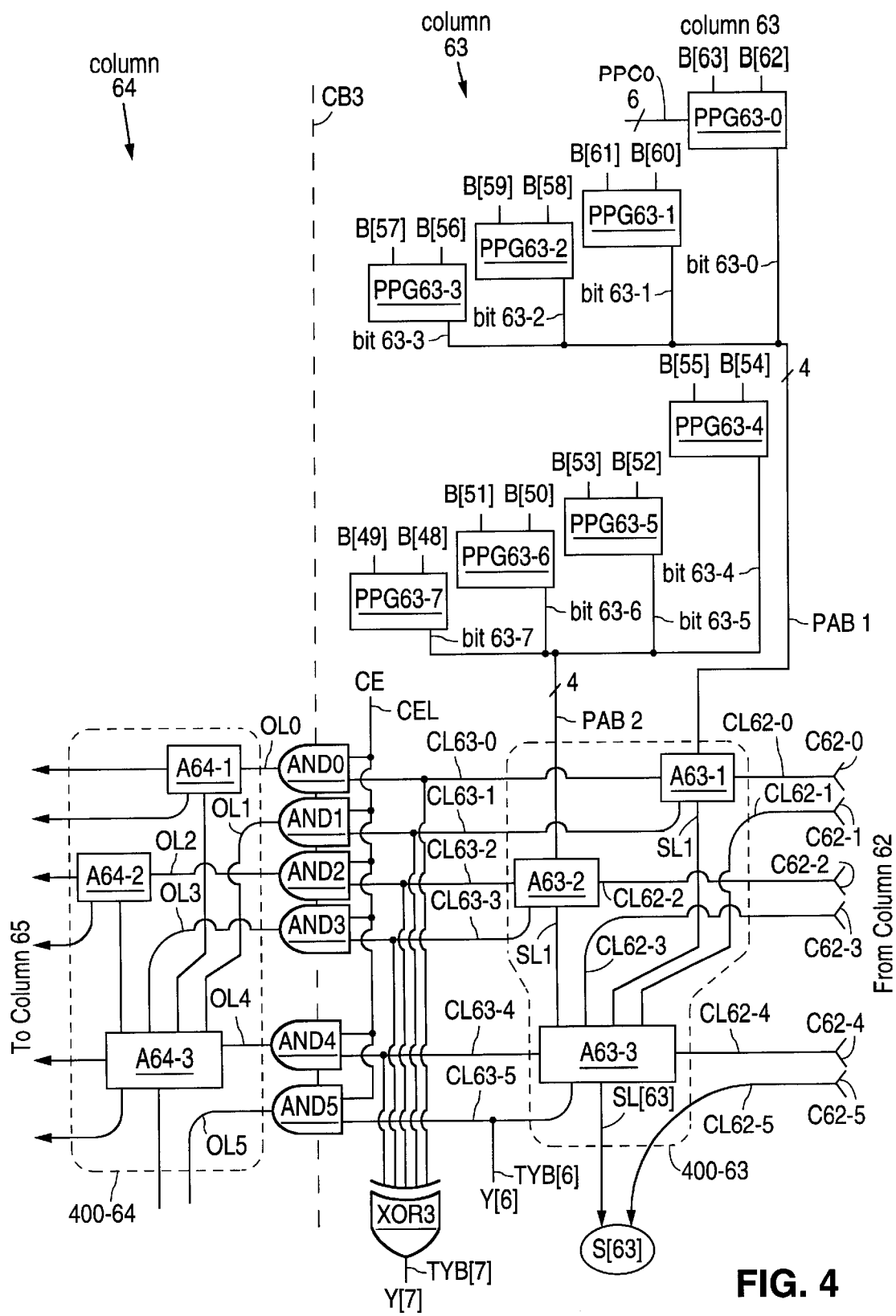
FIG. 4 shows a carry boundary and the structure of the two neighboring bit columns of the partitioned adder tree of FIG. 3.

FIG. 4 shows a carry boundary B3 and some of the structure of the two neighboring bit columns 63 and 64 of partitioned adder tree 310. Column 63 is configured to generate one bit of a corresponding partial product in each of 8 partial product generator PPG63-0, PPG63-1, PPG63-2, PPG63-3, PPG63-4, PPG63-5, PPG63-6, and PPG63-7.

Partial product generators PPG63-0, PPG63-1, PPG63-2, and PPG63-3 generate respective bits 63-0, 63-1, 63-2, and 63-3 corresponding to a respective bit of the first four partial products, each bit being equal in weight to the 63rd bit of the first partial products. For example, the partial product generator PPG63-3 for the fourth partial product generates either bit B[57], B[56], !B[57], !B[56] or a forced zero onto an output terminal depending on control signals issued for the fourth partial product by booth-recoder group BRG3. Bits 63-0, 63-1, 63-2, and 63-3 are propagated over bus PAB1. Partial product generators PPG63-4, PPG63-5, PPG63-6, and PPG63-7 generate and propagate bits 63-4 to 63-7 over bus PAB2.

Column adder 400-63 (represented by the dashed lines) receives the eight bits 63-0, 63-1, 63-2, 63-3, 63-4, 63-5, 63-6, and 63-7 provided by buses PAB1 and PAB2, and receives six carry bits C62-0, C62-1, C62-2, C62-3, C62-4, and C62-5 (generated by column 62) on respective lines CL62-0, CL62-1, CL62-2, CL62-3, CL62-4 and CL62-5. Column adder 400 provides a sum bit S[63] represented redundantly by the combination of lines SL[63] and CL62-5. Column adder 400 also provides six carry bits C63-0, C63-1, C63-2, C63-3, C63-4, and C63-5 on respective lines CL63-0, CL63-1, CL63-2, CL63-3, CL63-4 and CL63-5 to column 64.

At the carry boundary B3, AND gates AND0, AND1, AND2, AND3, AND4, and AND5 each receive one input bit from a carry enable signal CE on bus CEL. Each gate AND0, AND1, AND2, AND3, AND4, and AND5 receives its other input bit from a respective carry line CL63-0, CL63-1, CL-63-2, CL63-3, CL63-4, and CL63-5. The output bits of AND gates AND0, AND1, AND2, AND3, AND4, and AND5 are provided to column adder 400-64 over respective lines OL0, OL1, OL2, OL3, OL4, and OL5 to respective adders A64-1, C64-2, C64-3 in column 64.

Therefore, when the carry enable signal CE is high (i.e., a 1) carry bits C63-0, C63-1, C63-2, C63-3, C63-4, and C63-5 are propagated through respective AND gates AND0, AND1, AND2, AND3, AND4, and AND5 to respective lines OL0, OL1, OL2, OL3, OL4, and OL5 (i.e., the carry boundary is inactive). If the carry enable signal CE is low (i.e., a 0), carry bits on lines OL0, OL1, OL2, OL3, OL4, and are all 0 (i.e., the carry boundary B3 is active). Column boundaries B0, B1, B2, and B4 are provided in a similar manner as described above for carry boundary B3.

Whether or not a carry boundary is active, partitioned adder tree 310 generates two boundary carry bits Y(1:0], Y[3:2], Y[5:4], Y[7:6], and Y[9:8] near respective carry boundaries B0, B1, B2, B3, and B4 as follows. Referring to FIG. 4, XOR unit XOR3 receives carry lines CL63-0, CL63-1, CL63-2, CL63-3, and CL63-4, logically XOR'ing these values, and provides a resulting boundary carry bit Y[7] on boundary carry line YB[7] to location [7] of boundary carry register YR. In a similar manner, boundary carry bits Y[l], Y[3], Y[5], and Y[9] are provided over respective boundary carry lines YB[1], YB[33], YB[5], and YB[9] to respective locations [1], [3], [5], and [9] of boundary carry register YR.

The carry line CL63-5 is coupled to location [6] of boundary carry register SR such that carry bit C63-5 is written into location [6] of boundary carry register YR. In a similar manner, carry bits generated at carry boundaries B0, B1, B2, and 84 are written into respective locations [0], [2], [4], and [8] of boundary carry register YB.

The above describes how multiplier 300 provides bits S[79:0], C[79:0], and Y[9:0] to registers SR, CR, and YR. In a similar manner, multiplier 300' provides bits S' [79:0], C' [79:0], and Y' [9:0] to corresponding registers S'R, C'R, and Y'R.

Source registers SR1 and SR2 can be implemented by latches and are configured to store respective bit sequences A and B. The present invention may have source registers SR1 and SR2 of many sizes. In the example described below, source registers SR1 and SR2 are 64-bit registers and buses SRB1 and SRB2 are 64-bit buses.

Although the partitioned adder tree 310 is described above as being eight partial products deep, partitioned adder tree 310 can be any partial product depth (e.g., 12 partial products deep). Partitioned adder tree 310 may also be of an uneven depth. For example, parts 0 and 1 of partitioned adder tree 310 may be 12 partial products deep while parts 2 and 3 are only 8 partial products deep.

Although the partitioned adder tree 310 is described above as having four parts, partitioned adder tree 310 may be of any number of parts greater than one. Furthermore, more or less than 80 sum or carry bits can be generated by each partitioned adder tree 310.

The partitioned adder tree 310 is described above as performing any one of operations 1, 2, or 3 at any given time. However, the number of multiplexers providing encoding instructions or bits to each part and the number of parts may be varied to accomplish a large variety of operations.

Although the above partitioned adder tree 310 uses booth-recoding, this invention also applies to a partitioned adder tree that does not employ booth-recoding.

In the description and claims, the word "coupled" is defined as "having an interaction with" and can include direct connection, indirect connections, or interactions having no intermediate medium such as electromagnetic wave interactions.

Although the principles of the present invention have been described with reference to specific embodiments, these embodiments are illustrative only and not limiting. Many other applications and embodiments within the scope of the present invention will be apparent in light of this disclosure and the following claims.

What is claimed is:

1. A multiplier circuit, comprising:

a partitioned adder tree comprising (a) a plurality of parts, each part receiving a first operand and a second operand to provide a product of said first and second operands and (b) a carry circuit for selectably generating a carry value between said first and second parts of said partitioned adder tree;

a first multiplexer receiving a first plurality of data words, said first multiplexer configurable to provide any of said first plurality of data words as said first operand to any of said parts of said partitioned adder tree; and a second multiplexer receiving a second plurality of data words, said second multiplexer configurable to provide any of said data words as said second operand to any of said parts of said partitioned adder tree.

2. A multiplier circuit as in claim 1 wherein (a) to perform a first operation, a first data word in said first plurality of data words and a first data word in said second plurality of data words are provided to said first part of said partitioned adder tree, and a second data word of said first plurality of data words and a second data word of said second plurality of data words are provided to said second part of said partitioned adder tree; and (b) to perform a second operation, said first and second data words of said first plurality of data words and said first and second data words of said second plurality of data words are provided at said first part of said partitioned adder tree.

3. The multiplier circuit of claim 2, wherein each data word in said first and second plurality of data words is n-bit wide, and wherein (a) said first operation is an n-bit by n-bit multiplication, and (b) said second operation is a 2n-bit by 2n-bit multiplication, in which said first and second data words of said first plurality of data words constitute a single 2-n bit value.

4. The multiplier circuit of claim 1, further comprising an output register receiving said product of said first part of said partitioned adder tree into a first portion of said output register, and receiving said product from said second part of said partitioned adder tree into a second portion of said output register, wherein when said generating of said carry value is selected, data words in said first and second portions of said output register constitute parts of a single value.

5. The multiplier circuit of claim 1 wherein (a) in a first cycle of one operation, a first data word of said first plurality of data words is provided to both said first and second parts of said partitioned adder tree, and a first data word and a second data word of said second plurality of data words are provided as second operands to respective first and second parts of said partitioned adder tree, and (b) in a second cycle of said operation, a second data word of said first plurality of data words is provided to both said first and second parts of said partitioned adder tree, and said first data word and said second data word of said second plurality of data words are provided as second operands to respective first and second parts of said partitioned adder tree.

6. The multiplier circuit of claim 5 wherein (a) said first and second data words of said first plurality of data words constitute a part of a first value, (b) said first and second data words of said second plurality of data words constitute a part of a second value, and (b) said first and second cycles generate partial results of a multiplication of said first value to said second value.

7. The multiplier circuit of claim 1, further comprising a Booth encoder for Booth-encoding said first operand of each part of said partitioned adder tree.

* * * * *